US010680725B1

(12) United States Patent
Lu et al.

(10) Patent No.: US 10,680,725 B1
(45) Date of Patent: Jun. 9, 2020

(54) SELF-CALIBRATION OF PHASED ARRAY

(71) Applicant: QUALCOMM Incorporated, San Diego, CA (US)

(72) Inventors: Dai Lu, San Diego, CA (US); Robert Douglas, San Diego, CA (US); Andrew Arnett, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/418,740

(22) Filed: May 21, 2019

(51) Int. Cl.
H01Q 3/30 (2006.01)
H04B 17/12 (2015.01)
H01Q 3/26 (2006.01)
H04B 17/10 (2015.01)

(52) U.S. Cl.
CPC .............. H04B 17/12 (2015.01); H01Q 3/267 (2013.01); H01Q 3/2682 (2013.01); H04B 17/104 (2015.01)

(58) Field of Classification Search
CPC ....................................................... H01Q 3/00; H01Q 3/267; H01Q 3/30; H01Q 3/32605; H01Q 3/28; H01Q 3/36
See application file for complete search history.

(56) References Cited

U.S. PATENT DOCUMENTS 8,184,042 B2 * 5/2012 Ray .................. H01Q 3/267
342/174
8,842,040 B1 * 9/2014 Dorsey ............... H01Q 3/267
342/174
2016/0372828 A1 * 12/2016 Geis .................. H01Q 3/267
2017/0310004 A1 * 10/2017 Swirhun ............. H01Q 3/267
2019/0140349 A1 * 5/2019 Fikes .................. H01Q 3/267

FOREIGN PATENT DOCUMENTS

WO  WO-2011002934 A1 * 1/2011 ............. H01Q 3/267

OTHER PUBLICATIONS

Minggang Liu, et al., "Combined Rotating-element Electric-field Vector (CREV) Method for nearfield Calibration of Phased Array Antenna," IEEE 2007 International Conference on Microwave and Millimeter Wave Technology, Apr. 18-21, 2007, 4 pages.
Herbert M. Aumann, et al., "Phased Array Antenna Calibration and Pattern Prediction Using Mutual Coupling Measurements," IEEE Transactions on Antennas and Propagation, vol. 37, No. 7, Jul. 1989, 7 pages.

* cited by examiner

Primary Examiner — Blane J Jackson
(74) Attorney, Agent, or Firm — Loza & Loza, LLP/Qualcomm

(57) ABSTRACT

In certain aspects, a method for calibration includes setting a phase shift of a first phase shifter to a reference phase shift, wherein the first phase shifter shifts a phase of a first signal transmitted via a first antenna. The method also includes sequentially setting a phase shift of a second phase shifter to each one of a first plurality of phase shifts, wherein the second phase shifter shifts a phase of a second signal transmitted via a second antenna. The method further includes receiving the first and second signals at a receiver via a third antenna, and, for each one of the first plurality of phase shifts, measuring a magnitude of a third signal at the receiver, wherein the third signal includes the received first and second signals. The method further includes determining a calibration phase shift based on one or more of the measured magnitudes.

20 Claims, 13 Drawing Sheets

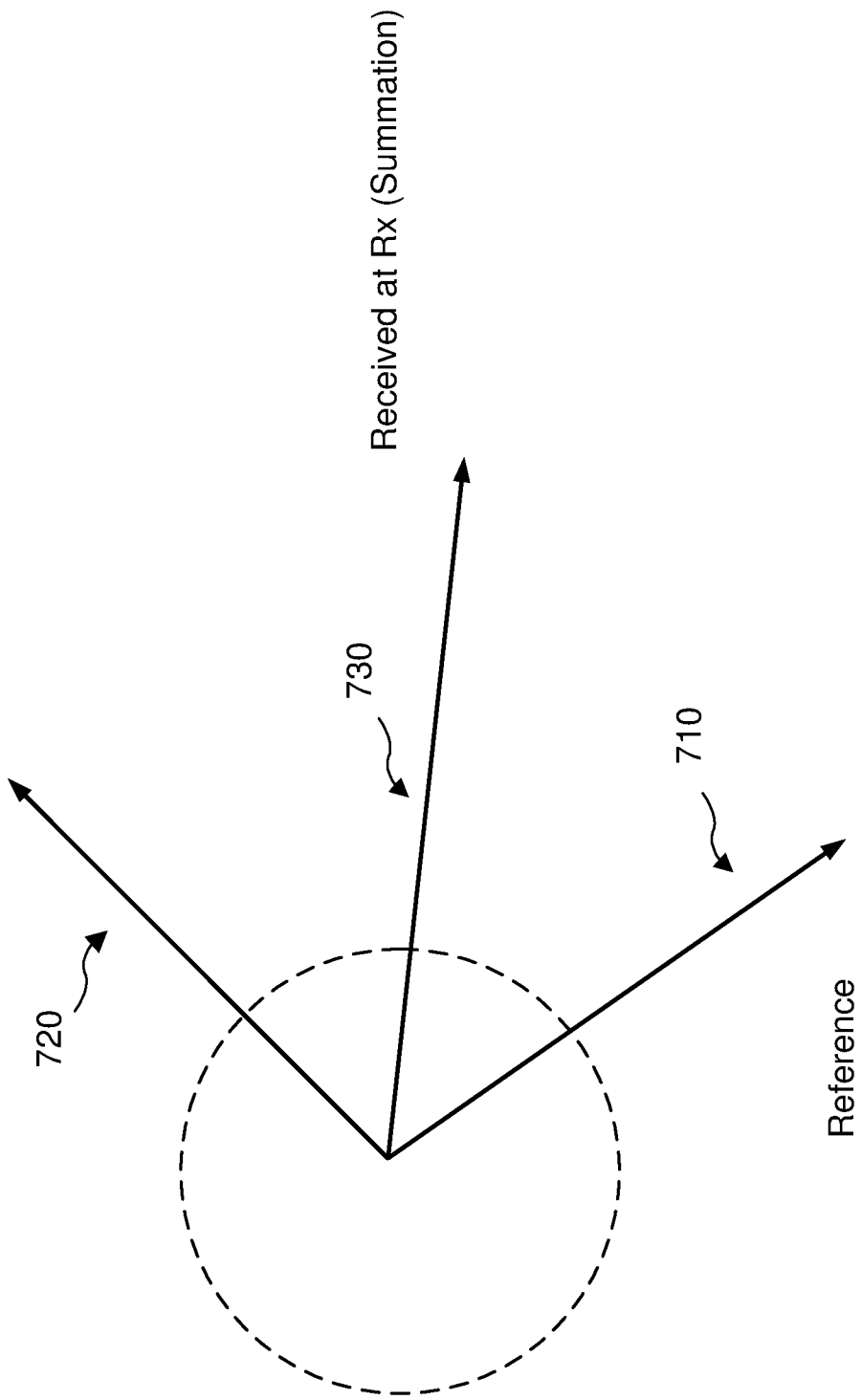

SELF-CALIBRATION OF PHASED ARRAY

BACKGROUND

Field

Aspects of the present disclosure relate generally to phased arrays, and more particularly, to self-calibration of phased arrays.

Background

Wireless communication systems (e.g., fifth generation (5G)) that operate in the millimeter wave (mmWave) band are being developed to provide significantly faster data rates. A challenge with wireless communication in the mmWave band is that mmWave signals suffer from high signal attenuation (e.g., due to high atmospheric absorption and the shorter wavelength of mmWave). To compensate for high signal attenuation, a wireless device operating in the mmWave band may employ a phased array, which allows the wireless device to transmit and receive signals with high directivity for improved range.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a method for calibration. The method includes setting a phase shift of a first phase shifter to a reference phase shift, wherein the first phase shifter shifts a phase of a first signal transmitted via a first antenna. The method also includes sequentially setting a phase shift of a second phase shifter to each one of a first plurality of phase shifts, wherein the second phase shifter shifts a phase of a second signal transmitted via a second antenna. The method further includes receiving the first and second signals at a receiver via a third antenna, and, for each one of the first plurality of phase shifts, measuring a magnitude of a third signal at the receiver, wherein the third signal includes the received first and second signals. The method further includes determining a calibration phase shift based on one or more of the measured magnitudes.

A second aspect relates to a system. The system includes a first phase shifter configured to shift a phase of a first signal transmitted via a first antenna, a second phase shifter configured to shift a phase of a second signal transmitted via a second antenna, a receiver configured to receive the first and second signals via a third antenna, and a controller. The controller is configured to set a phase shift of the first phase shifter to a reference phase shift, sequentially set a phase shift of the second phase shifter to each one of a first plurality of phase shifts, and, for each one of the first plurality of phase shifts, measure a magnitude of a third signal at the receiver, wherein the third signal includes the received first and second signals. The controller is also configured to determine a calibration phase shift based on one or more of the measured magnitudes.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 7 is a vector diagram of exemplary signals used in self-calibration according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Wireless communication systems (e.g., 5G) operating in the mmWave band suffer from high signal attenuation (e.g., due to high atmospheric absorption and the shorter wavelength of mmWave). To compensate for high signal attenuation, wireless communication systems operating in the mmWave band employ phased arrays for transmission and reception. A phased array (also referred to as a phased antenna array) includes an array of antennas. The phased array allows the wireless device to form a beam for transmission and/or reception using beamforming. The beam extends the range of the wireless device by focusing energy in a desired direction.

Figure 1:
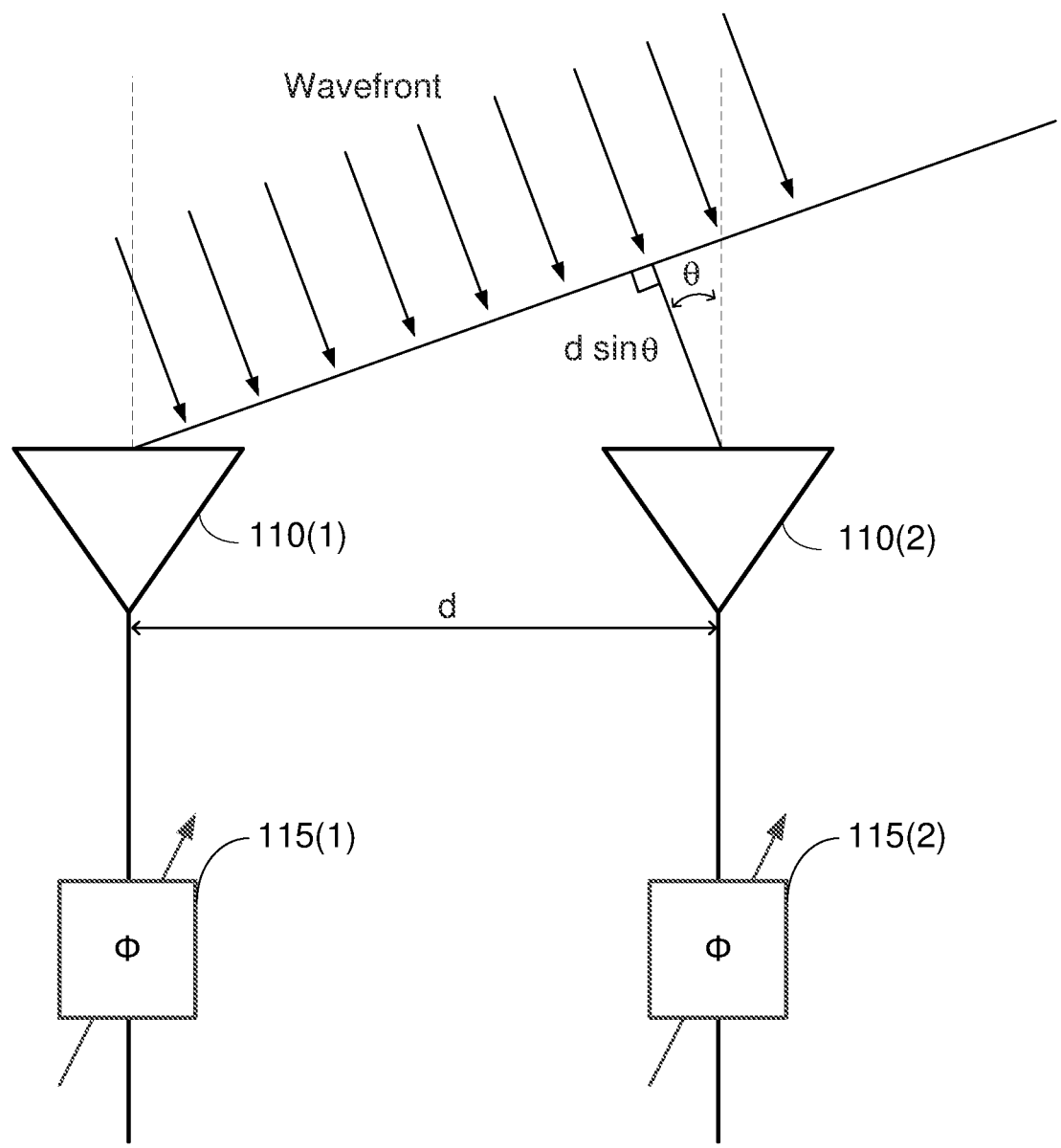
FIG. 1 illustrates beam steering using phase shifters according to certain aspects of the present disclosure.

The beam of a phased array may be electronically steered by adjusting the relative phases between the antennas in the phased array. This is illustrated with reference to FIG. 1, which shows an example of two adjacent antennas 110(1) and 110(2) of the phased array. The antennas 110(1) to 110(2) are coupled to adjustable (i.e., tunable) phase shifters 115(1) to 115(2), respectively, which are used to adjust the relative phase between the antennas 110(1) and 110(2).

In this example, the distance (i.e., spacing) between the antennas 110(1) and 110(2) is d, and the wavefront of a radio signal to be received by the phased array arrives at an angle θ with respect to the antenna boresight. In this example, the wavefront of the radio signal needs to travel an additional distance of d·sin θ to reach antenna 110(2) relative to antenna 110(1). This additional distance translates to a time delay of:

$$\Delta t = \frac{d \sin \theta}{c} \quad \text{(Eq. 1)}$$

where Δt is the time delay and c is the propagation speed of the radio signal. The time delay Δt can be expressed as a phase shift for a given frequency f as follows:

$$\Delta \phi = 2\pi f \Delta t \quad \text{(Eq. 2)}$$

where Δϕ is the phase shift between the antennas 110(1) and 110(2). Equations (1) and (2) can be combined to express the phase shift as follows:

$$\Delta \phi = 2\pi \left(\frac{d}{\lambda}\right) \sin \theta \quad \text{(Eq. 3)}$$

where λ is the wavelength of the radio signal given by c/f. Thus, to point the beam of the phased array at an angle of θ, the phase shifters 115(1) and 115(2) may be adjusted to provide a phase shift of approximately Δϕ between the antennas 110(1) and 110(2).

Figure 2:
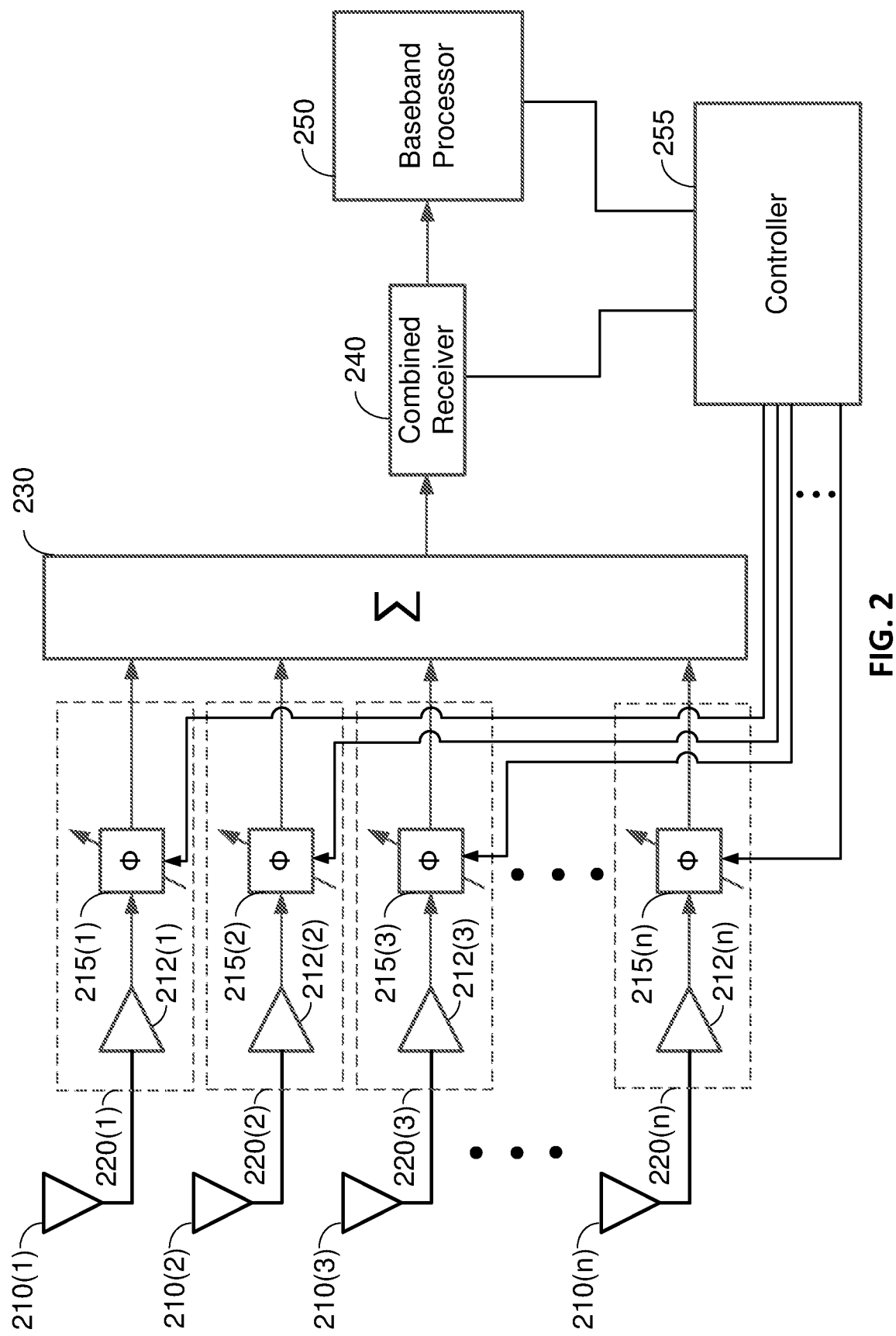
FIG. 2 shows an example of a phased array receiver according to certain aspects of the present disclosure.
Figure 3:
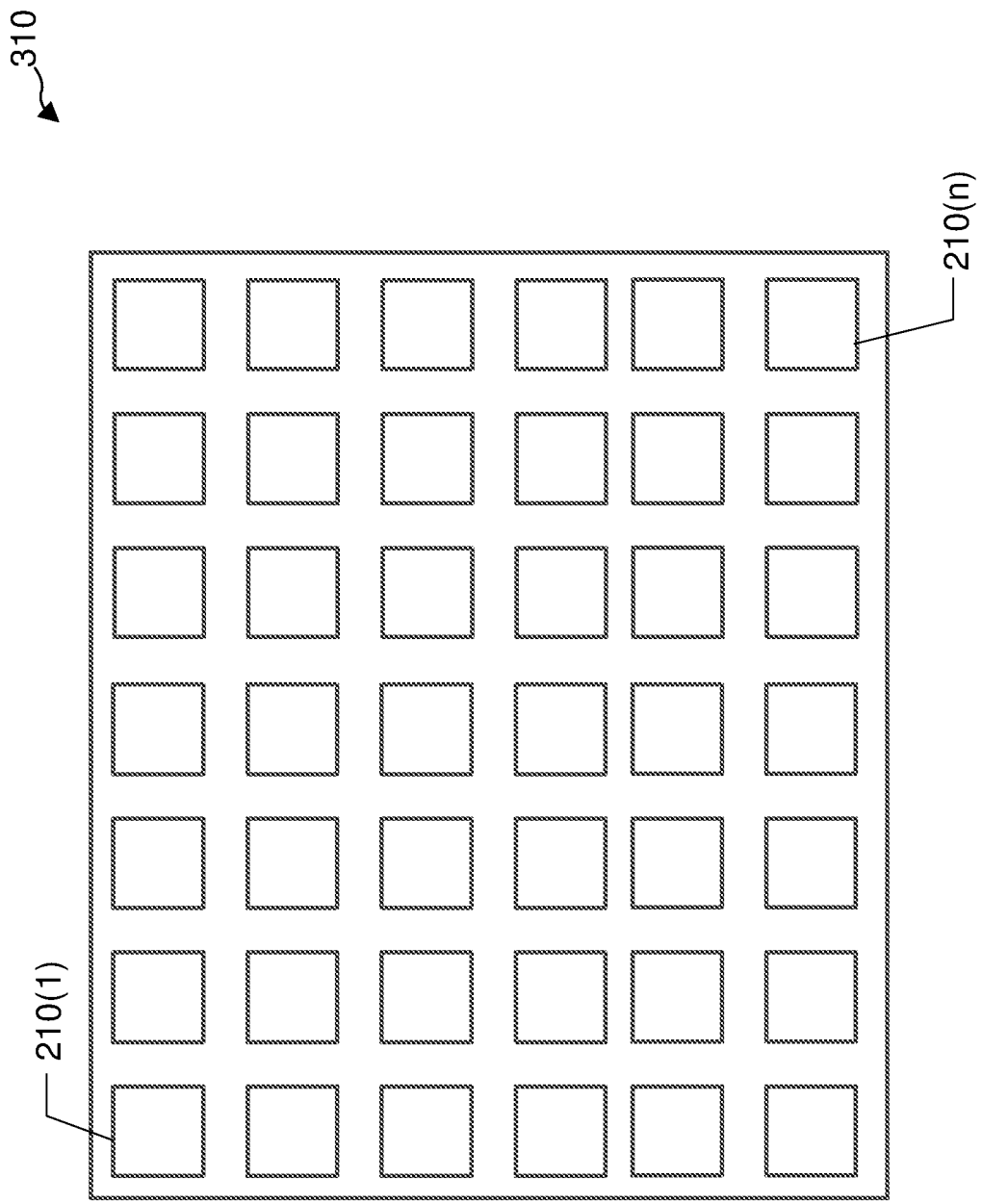
FIG. 3 shows an example of an array of antennas according to certain aspects of the present disclosure.

FIG. 2 shows an example of a phased array receiver for a phased array according to aspects of the present disclosure. In this example, the phased array includes an array of antennas 210(1) to 210(n), and the phased array receiver includes multiple receiver chains 220(1) to 220(n), a combiner 230, and a combined receiver 240. The antennas 210(1) to 210(n) may be arranged in a two-dimensional array, an example of which is shown in FIG. 3. In this example, the antennas 210(1) to 210(n) are implemented with patch antennas arranged in a two-dimensional array 310 with equal spacing between adjacent antennas.

Returning to FIG. 2, each receiver chain 220(1) to 220(n) has an input coupled to a respective one of the antennas 210(1) to 210(n) and an output coupled to the combiner 230. Each receiver chain 220(1) to 220(n) includes a respective low noise amplifier (LNA) 212(1) to 212(n) and a respective phase shifter 215(1) to 215(n). In this example, the signal received by each antenna 210(1) to 210(n) is input to the respective receiver chain 220(1) to 220(n). In each receiver chain 220(1) to 220(n), the respective LNA 212(1) to 212(n) amplifies the signal from the respective antenna, and the respective phase shifter 215(1) to 215(n) shifts the phase of the signal by a respective phase shift, as discussed further below.

It is to be appreciated that each receiver chain 220(1) to 220(n) may include one or more additional components (not shown) in addition to the respective LNA 212(1) to 212(n) and the respective phase shifter 215(1) to 215(n) shown in FIG. 2. For example, each receiver chain 220(1) to 220(n) may also include a respective mixer (not shown) for mixing the respective signal with a local oscillator signal to downconvert the frequency of the respective signal from a radio frequency (RF) to an intermediate frequency (IF) or baseband.

The combiner 230 (e.g., a power combiner) is configured to combine the output signals of the receiver chains 220(1) to 220(n) into a combined signal. The combiner 230 outputs the combined signal to the combined receiver 240, which processes the combined signal. Processing performed by the combined receiver 240 may include frequency downconversion, amplification, filtering, analog-to-digital conversion, etc. As discussed above, the receiver chains 220(1) to 220(n) may each include a mixer for performing frequency downconversion. Alternatively, the frequency downconversion may be performed on the combined signal in the combined receiver 240. In one example, the receiver chains 220(1) to 220(2) may perform frequency downconversion from RF to IF, and the combined receiver 240 may perform frequency downconversion from IF to baseband.

The combined receiver 240 outputs the processed signal to a baseband processor 250 for further processing. For example, the baseband processor 250 may further process the signal to recover data from the signal. The recovered data may be stored in a memory and/or sent to another processor (e.g., a central processing unit (CPU)) for further processing.

A controller 255 sets the phase shifts of the phase shifters 215(1) to 215(n) based on a desired receive beam direction for the phased array. More particularly, the controller 255 sets the phase shift of each phase shifter 215(1) to 215(n) such that the relative phases between the antennas 210(1) to 210(n) correspond to the desired receive beam direction (e.g., based on equation (3)). The phase shifts by the phase shifters 215(1) to 215(n) cause signals received by the antennas 210(1) to 210(n) in the desired direction to be approximately aligned in phase at the inputs of the combiner 230.

The desired receive beam direction may point in the direction of a wireless device transmitting signals to the phased array. For example, the phased array may be in a mobile wireless device and the wireless device transmitting the signals to the phased array may be a base station, or vice versa.

In certain aspects, the phase shift of each phase shifter 215(1) to 215(n) may be set to any one of M selectable phase shifts. In one example, the selectable phase shifts may be equally spaced apart by a phase step approximately equal to 360 degrees divided by M. In other aspects, the phase shift of each phase shifter 215(1) to 215(n) may be continuously adjusted (i.e., tuned).

Figure 4:
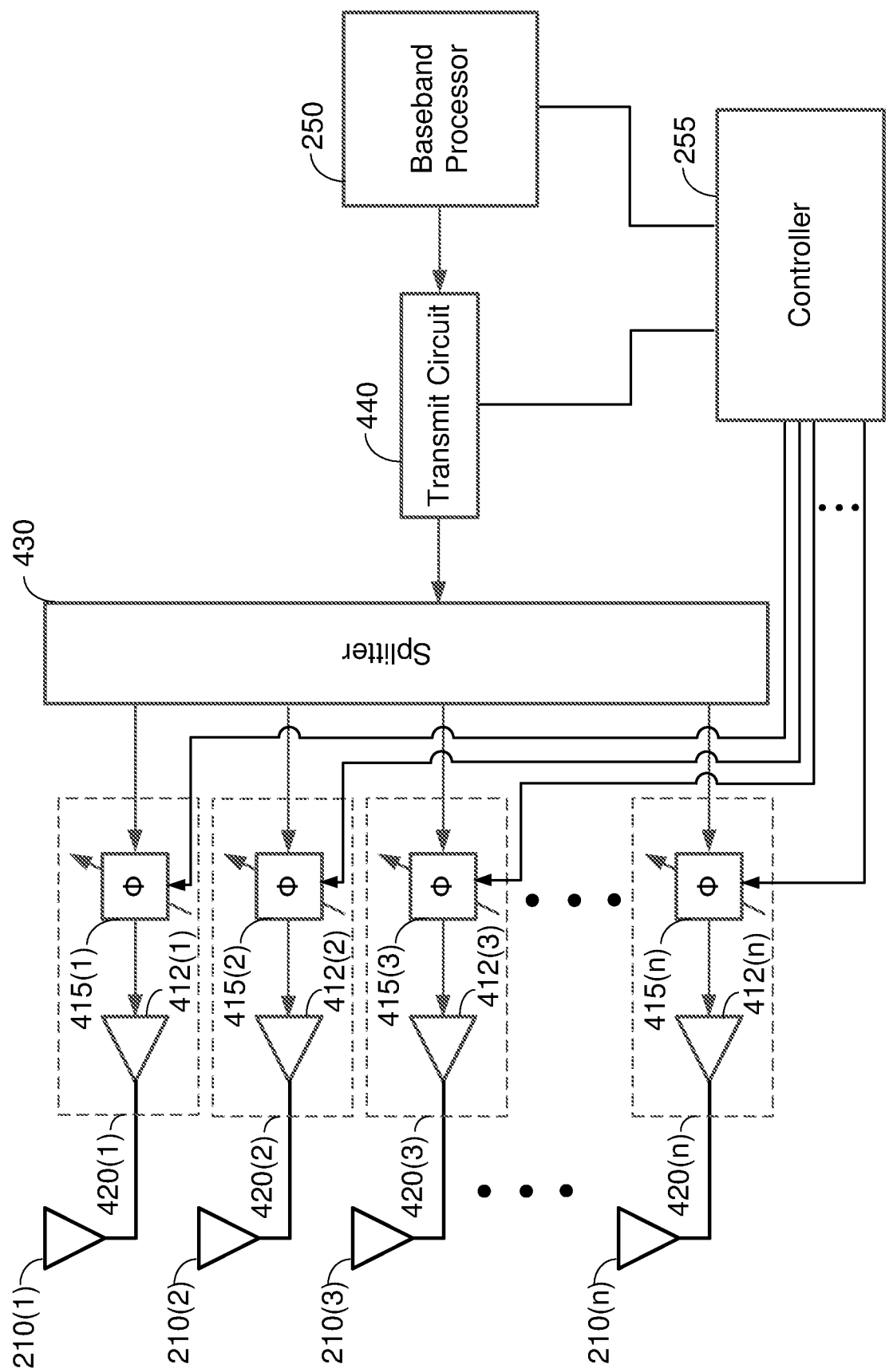
FIG. 4 shows an example of a phased array transmitter according to certain aspects of the present disclosure.

FIG. 4 shows an example of a phased array transmitter for the phased array according to aspects of the present disclosure. In this example, the phased array transmitter includes a transmit circuit 440, a splitter 430, and multiple transmitter chains 420(1) to 420(n). Each transmitter chain 420(1) to 420(n) has an input coupled to the splitter 430 and an output coupled to a respective one of the antennas 210(1) to 210(n).

In operation, the baseband processor 250 outputs a signal to be transmitted to the transmit circuit 440. The transmit circuit 440 processes the received signal for transmission. Processing performed by the transmit circuit 440 may include digital-to-analog conversion, frequency upconversion, amplification, etc. The transmit circuit 440 outputs the processed signal to the splitter 430. The splitter 430 (e.g., power splitter) splits the signal from the transmit circuit 440 into multiple signals, and inputs each of the multiple signals to a respective one of the transmitter chains 420(1) to 420(n).

Each transmitter chain 420(1) to 420(n) includes a respective phase shifter 415(1) to 415(n) and a respective power amplifier (PA) 412(1) to 412(2). In each transmitter chain 420(1) to 420(n), the respective phase shifter 415(1) to 415(n) shifts the phase of the respective signal by a respective phase shift, and the respective PA 412(1) to 412(n) amplifies the respective signal. The output signal of each transmitter chain 420(1) to 420(n) is fed to the respective antenna 210(1) to 210(n) for transmission.

It is to be appreciated that each transmitter chain 420(1) to 420(n) may include one or more additional components (not shown) in addition to the respective phase shifter 415(1) to 415(n) and the respective PA 412(1) to 412(n) shown in FIG. 4. For example, each transmitter chain 420(1) to 420(n) may also include a respective mixer (not shown) for mixing the respective signal with a local oscillator signal to upconvert the frequency of the respective signal from IF or baseband to RF. Alternatively, the frequency upconversion to RF may be performed in the transmit circuit 440. In one example, the transmit circuit 440 may perform frequency upconversion from baseband to IF, and the transmitter chains 420(1) to 420(n) may perform frequency upconversion from IF to RF.

The controller 255 sets the phase shifts of the phase shifters 415(1) to 415(n) based on a desired transmit beam direction for the phased array. More particularly, the controller 255 sets the phase shift of each phase shifter 415(1) to 415(n) such that the relative phases between the antennas 210(1) to 210(n) correspond to the desired beam direction (e.g., based on equation (3)).

The desired transmit beam direction may point in the direction of a wireless device receiving signals from the phased array. For example, the phased array may be in a mobile wireless device and the wireless device receiving the signals from the phased array may be a base station, or vice versa.

Figure 5:
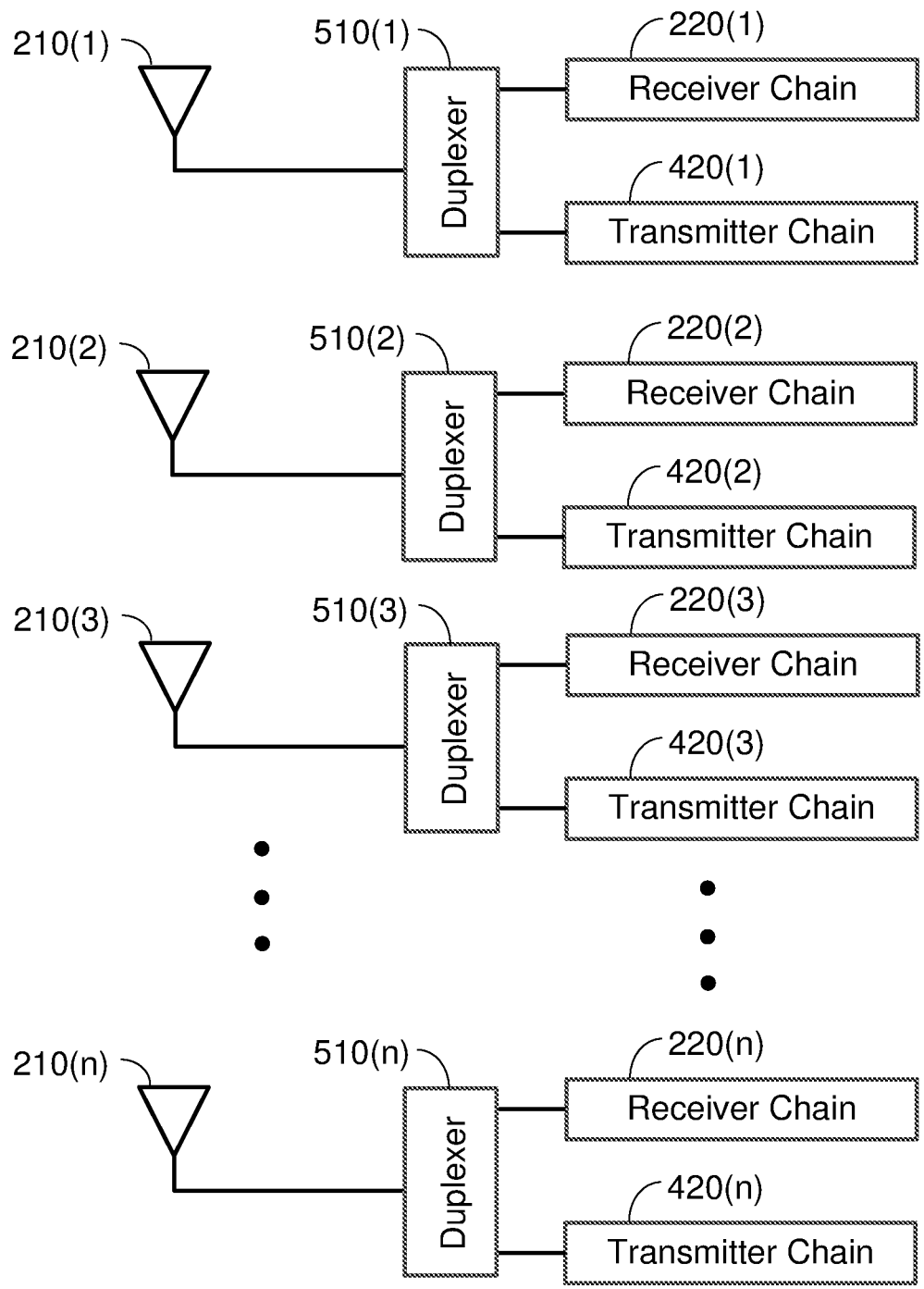
FIG. 5 shows an example of receiver chains and transmitter chains sharing antennas using duplexers according to certain aspects of the present disclosure.

In the above examples, the receiver chains 220(1) to 220(n) and the transmitter chains 420(1) to 420(n) share the antennas 210(1) to 210(n) of the phased array. This may be accomplished, for example, using duplexers. In this regard, FIG. 5 shows an example in which each antenna 210(1) to 210(n) is coupled to the respective receiver chain 220(1) to 220(n) and the respective transmitter chain 420(1) to 420(n) via a respective duplexer 510(1) to 510(n). In this example, each duplexer 510(1) to 510(n) is configured to couple the respective antenna 210(1) to 210(n) to the respective receiver chain 220(1) to 220(n) and the respective transmitter chain 420(1) to 420(n) while isolating the respective receiver chain 220(1) to 220(n) from the respective transmitter chain 420(1) to 420(n). Each duplexer 510(1) to 510(n) may be implemented with a transmit-receive switch, a diplexer, or another type of duplexer. Transmit-receive switches allow each antenna 210(1) to 210(n) to be switched between the respective receiver chain 220(1) to 220(n) and the respective transmitter chain 420(1) to 420(n). Note that, for ease of illustration, the combiner 230 and the splitter 430 are not shown in FIG. 5.

Thus, the beam of the phased array may be electronically steered to a desired direction by setting the phase shifts of the phase shifters 215(1) to 215(n) or 415(1) to 415(n) based on the desired direction. The accuracy of the beam pointing depends on the accuracy of the phase shifts applied to the signals received by the antennas 210(1) to 210(n) or the phase shifts applied to the signals fed to the antennas 210(1) to 210(n). A challenge is that variations in the internal circuitry of the phased array receiver (e.g., due to variations in manufacturing) create phase offsets between the signal paths in the phased array receiver. Similarly, variations in the internal circuitry of the phased array transmitter (e.g., due to variations in manufacturing) create phase offsets between the signal paths in the phased array transmitter. In addition, variations in the delays of the signal paths between the antennas 210(1) to 210(n) and the respective duplexers 510(1) to 510(n) contribute to phase offsets. If not accounted for, the above phase offsets can substantially reduce the accuracy of beamforming.

To address this, a calibration procedure is typically performed to determine calibration phase shifts for the phase shifters 215(1) to 215(n) and 415(1) to 415(n) that compensate for the phase offsets discussed above. The calibration may be performed in a factory or in the field (i.e., self-calibration). An advantage of self-calibration is that self-calibration can be performed periodically in the field to update the calibration phase shifts to account for changes in the phase offsets over time due component aging and other material changes over time.

Figure 6A:
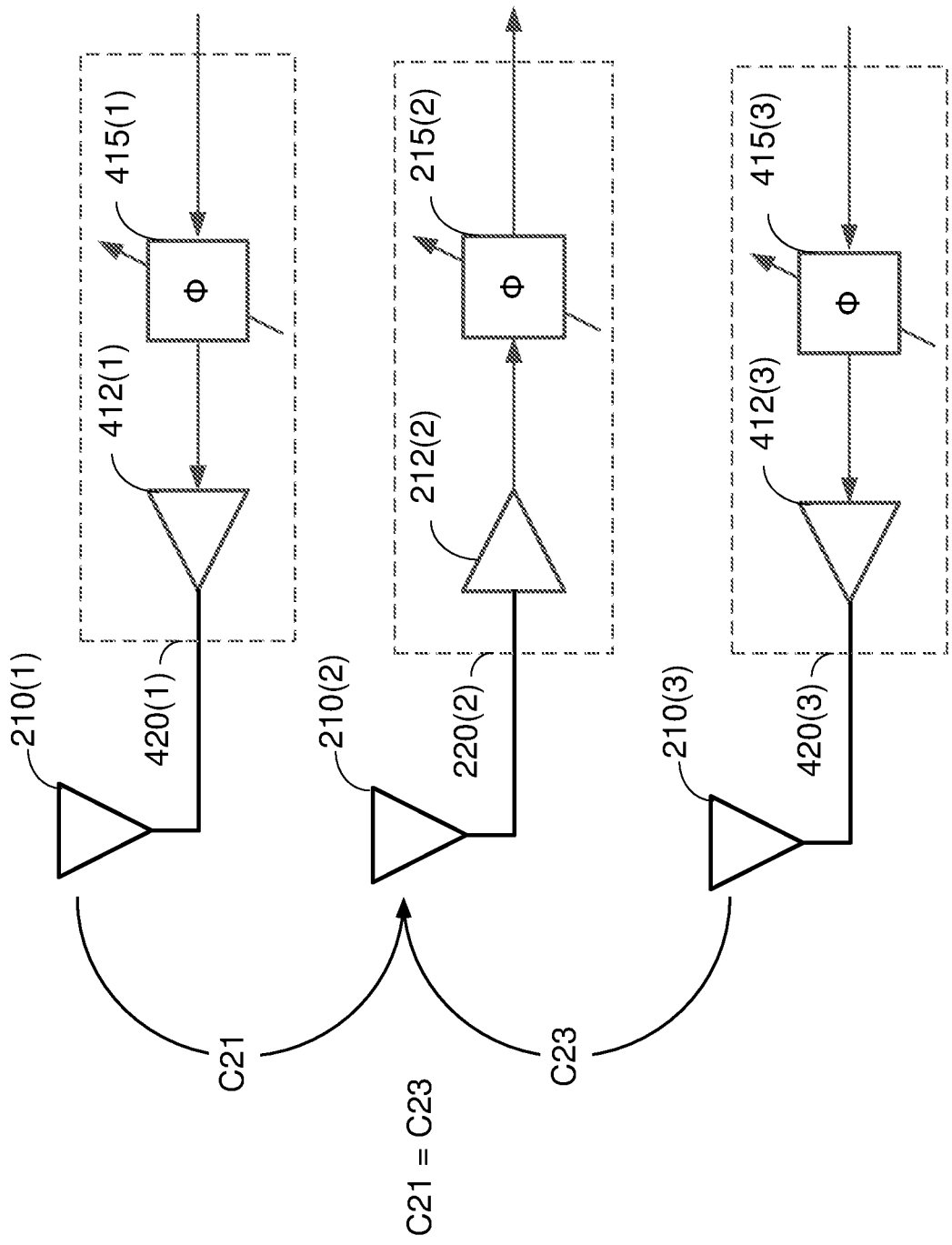
FIG. 6A shows an exemplary configuration for performing self-calibration of phased array antennas according to certain aspects of the present disclosure.

Examples of self-calibration using mutual coupling between antennas will now be described according to aspects of the present disclosure. FIG. 6A illustrates an example of self-calibration for calibrating the relative phase between two antennas of the phased array. The self-calibration includes simultaneously transmitting signals from the two antennas while receiving the signals at a third antenna of the phased array. In the example shown in FIG. 6A, the two transmitting antennas are antennas 210(1) and 210(3) and the receiving antenna is antenna 210(2). In this example, the receiving antenna 210(2) is located between the transmitting antennas 210(1) and 210(3), and is approximately equidistant from the transmitting antennas 210(1) and 210 (3). As a result, the configuration of the antennas 210(1) to 210(3) is symmetric about the receiving antenna 201(2). Because of the symmetry about the receiving antenna 210 (2), the mutual coupling between the receiving antenna 210(2) and transmitting antenna 210(1) (denoted "C21") is approximately equal to the mutual coupling between the receiving antenna 210(2) and transmitting antenna 210(3) (denoted "C23").

Figure 6B:
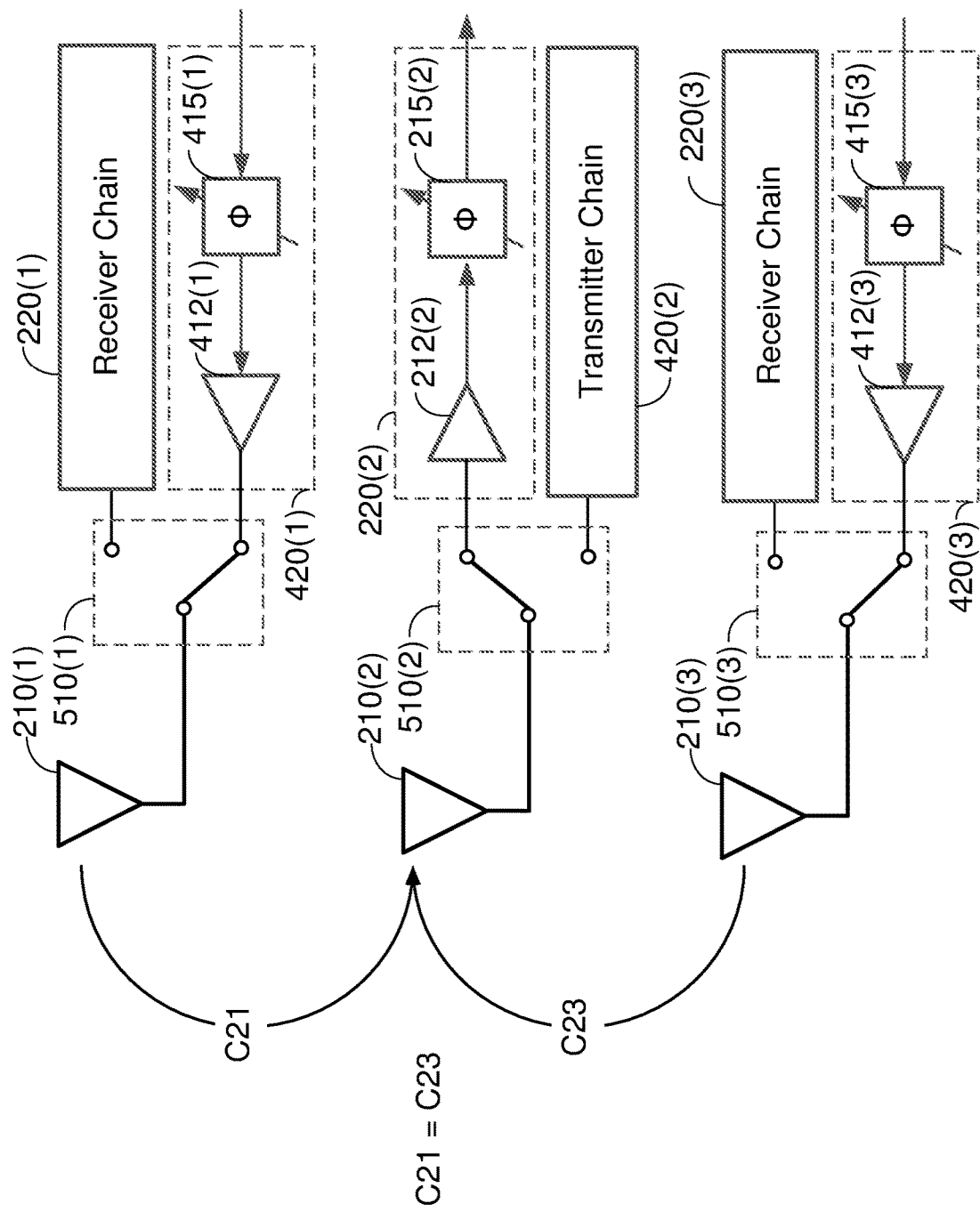
FIG. 6B shows an example of the configuration in FIG. 6A using transmit-receive switches according to certain aspects of the present disclosure.

FIG. 6B shows an example in which the duplexers 510(1) to 510(3) corresponding to the antennas 210(1) to 210(3) are implemented with transmit-receive switches. In this example, the controller 255 sets the transmit-receive switches 510(1) and 510(3) for the transmitting antennas 210(1) and 210(3) such that the transmit-receive switches 510(1) and 510(3) couple the transmitting antennas 210(1) and 210(3) to the respective transmitter chains 420(1) and 420(3). The controller 255 sets the transmit-receive switch 510(2) for the receiving antenna 210(2) such that the transmit-receive switch 510(2) couples the receiving antenna 210(2) to the respective receiver chain 220(2).

FIG. 7 is a vector diagram showing an example of a vector 710 representing the signal transmitted from antenna 210(1)

and an example of a vector 720 representing the signal transmitted from antenna 210(3) at the start of self-calibration. Each vector 710 and 720 indicates the magnitude and phase of the respective signal. In this example, the signals transmitted from the antennas 210(1) and 210(3) are not in phase at the start of self-calibration (i.e., the relative phase between the antennas 210(1) and 210(3) is not zero). As a result, the phases of the corresponding vectors 710 and 720 are not aligned. FIG. 7 also shows an example of a vector 730 representing the signal received by the receiving antenna 210(2). The received signal is a summation of the signal from antenna 210(1) and the signal from antenna 210(3).

The magnitude of the received signal is maximum when the signals transmitted from the antennas 210(1) and 210(3) are in phase (i.e., the relative phase between the antennas 210(1) and 210(3) is zero). The magnitude of the received signal is minimum when the signals transmitted from the antennas 210(1) and 210(3) are 180 degrees out of phase (i.e., the relative phase between the antennas 210(1) and 210(3) is 180 degrees). This property is utilized during self-calibration to determine when the relative phase between the antennas 210(1) and 210(3) is approximately zero or 180 degrees based on magnitude measurements, as discussed further below.

Figure 8:
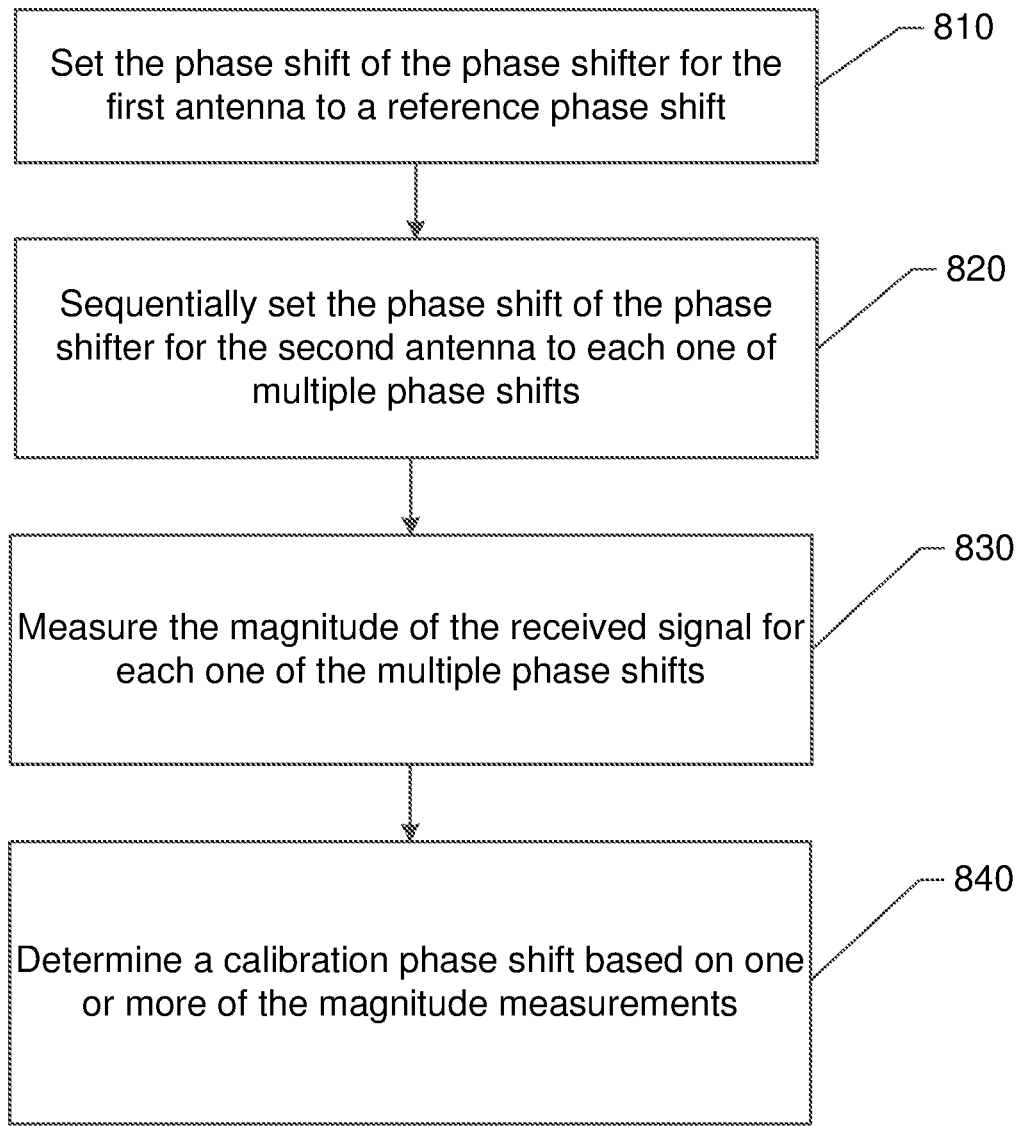
FIG. 8 is a flowchart illustrating an exemplary self-calibration method according to certain aspects of the present disclosure.

An exemplary self-calibration method 800 using the setup illustrated in FIGS. 6A, 6B and 7 will now be discussed with reference to FIG. 8 according to certain aspects. The self-calibration method 800 may be performed by the controller 255. In the discussion below, antenna 210(1) is referred to as the first antenna, antenna 210(3) is referred to as the second antenna, and antenna 210(2) is referred to as the third antenna.

At block 810, the controller 255 sets the phase shift of the phase shifter 415(1) for the first antenna 210(1) to a reference phase shift. During the self-calibration, the phase shifter 415(1) may remain fixed at the reference phase shift. In this case, the signal transmitted from the first antenna 210(1) serves as a reference signal for the self-calibration. In FIG. 7, this is represented by the vector 710 (which represents the reference signal) remaining fixed during the self-calibration.

At block 820, the controller 255 sequentially sets the phase shift of the phase shifter 415(3) for the second antenna 210(3) to each one of multiple phase shifts. In FIG. 7, this is represented by rotating the phase of the vector 720. The multiple phase shifts may be spaced apart by a phase step. At each one of the multiple phase shifts, the first and second antennas 210(1) and 210(3) simultaneously transmit their respective signals, which are received by the third antenna 210(2). The first antenna 210(1) may transmit at approximately the same power for each of the multiple phase shifts, and the second antenna 210(3) may transmit at approximately the same power for each of the multiple phase shifts. The signals transmitted by the first and second antennas 210(1) and 210(3) may each be a sinusoidal signal having a frequency within the mmWave band.

At block 830, the controller 255 measures the magnitude of the received signal at the third antenna 210(2) for each of the multiple phase shifts. The received signal includes the signals from the first and second antennas 210(1) and 210(3).

At block 840, the controller 255 determines a calibration phase shift for the second antenna 210(3) based on one or more of the magnitude measurements. For example, the controller 255 may determine which one of the multiple phase shifts corresponds to (i.e., results in) the maximum magnitude measurement for the received signal. The maximum magnitude occurs when the signals transmitted from the first and second antennas 210(1) and 210(3) are approximately in phase (i.e., the relative phase between the first and second antennas 210(1) and 210(3) is approximately zero). In this example, the controller 255 may determine the calibration phase shift by determining the difference between the phase shift corresponding to the maximum magnitude measurement and the reference phase shift, and using the difference for the calibration phase shift.

In another example, the controller 255 may determine which one of the multiple phase shifts corresponds to (i.e., results in) the minimum magnitude measurement for the received signal. The minimum magnitude occurs when the signals transmitted from the first and second antennas 210(1) and 210(3) are approximately 180 degrees out of phase (i.e., the relative phase between the first and second antennas 210(1) and 210(3) is approximately 180 degrees). In this example, the controller 255 may determine the calibration phase shift by adjusting the phase shift corresponding to the minimum magnitude measurement by 180 degrees, determining the difference between the adjusted phase shift and the reference phase shift, and using the difference for the calibration phase shift. In this example, the phase shift corresponding to the maximum magnitude is derived by adjusting the phase shift corresponding to the minimum magnitude by 180 degrees.

In certain aspects, the controller 255 may sequentially set the phase shift of the phase shifter 415(3) for the second antenna 210(3) to each one of the multiple phase shifts at block 820 as follows. The controller 255 may rotate the phase of the signal transmitted from the second antenna 210(3) by changing the phase shift of the phase shifter 415(3) in steps. At each step, the controller 255 changes the phase shift of the phase shifter 415(3) by the phase step discussed above and measures the magnitude of the received signal at the third antenna 210(2). The controller 255 stops the phase rotation when the controller 255 detects the maximum magnitude of the received signal. The controller 255 may detect the maximum magnitude by detecting when the measured magnitude at a particular step is larger than the measured magnitude at the immediately preceding step and the measured magnitude at the immediately succeeding step. Once the maximum magnitude is detected, the controller 255 may determine the difference between the phase shift corresponding to the maximum magnitude and the reference phase shift, and use the difference for the calibration phase shift. In this example, the phase rotation may start at the reference phase shift or another phase shift.

In another example, the controller 255 stops the phase rotation discussed above when the controller 255 detects the minimum magnitude of the received signal. The controller 255 may detect the minimum magnitude by detecting when the measured magnitude at a particular step is smaller than the measured magnitude at the immediately preceding step and the measured magnitude at the immediately succeeding step. Once the minimum magnitude is detected, the controller 255 may adjust the phase shift corresponding to the minimum magnitude by approximately 180 degrees to derive the phase shift corresponding to the maximum magnitude. The controller 255 may then determine the difference between the adjusted phase shift (i.e., the derived phase shift corresponding to the maximum magnitude) and the reference phase shift, and use the difference for the calibration phase shift. In this example, the phase rotation may start at the reference phase shift or another phase shift.

After the controller 255 determines the calibration phase shift for the second antenna 210(3), the controller 255 may store the calibration phase shift for the second antenna 210(3) in a memory for later use. During normal operation, the controller 255 sets the relative phase between the first antenna 210(1) and the second antenna 210(3) based on a desired beam direction as follows. The controller 255 sets the phase shift of the phase shifter 415(1) for the first antenna 210(1) to a phase shift, which may be the same as the reference phase shift or different from the reference phase shift. The controller 255 sets the phase shift of the phase shifter 415(3) for the second antenna 210(3) based on the following:

$$\text{phase\_shift\_2} = \text{phase\_shift\_1} + \Delta\phi + \text{calibration\_phase\_shift} \quad (\text{Eq. 4})$$

where phase_shift_2 is the phase shift of the phase shifter 415(3) for the second antenna 210(3), phase_shift_1 is the phase shift of the phase shifter 415(1) for the first antenna 210(1), $\Delta\phi$ is the phase shift corresponding to the desired beam direction, and calibration_phase_shift is the calibration phase shift. In this example, the phase shift $\Delta\phi$ sets the relative phase between the first antenna 210(1) and the second antenna 210(3) based on the desired beam direction, and the calibration phase shift compensates for the phase offset due to variations in the internal circuitry of the phased array transmitter/receiver.

The controller 255 may perform the self-calibration discussed above for each of one multiple pairs of antennas of the phased array to determine a set of calibration phase shifts for the phased array. The controller 255 may store the set of calibration phase shifts in the memory for later use. During normal operation, the controller 255 uses the set of calibration phase shifts in the manner discussed above to more accurately steer a beam in a desired direction.

As discussed above, in certain aspects, the phase shift of a phase shifter is incremented by a phase step. In these aspects, the accuracy of a calibration phase shift depends on the size of the phase step. The smaller the phase step size (i.e., the finer the resolution), the higher the accuracy of the calibration phase shift. Thus, the accuracy of the self-calibration may be improved by increasing the resolution of the phase shifters 215(1) to 215(n) and 415(1) to 415(n).

An advantage of the self-calibration according aspects of the present disclosure is that the self-calibration is based on magnitude measurements of the received signal without the need for phase measurements of the received signal. This reduces the cost and area of the hardware used for the self-calibration since the self-calibration does not require hardware for measuring the phase of the received signal. Hardware for measuring the magnitude of the received signal may include a digital-to-analog converter, an analog-to-digital converter, an envelope detector, a DSP, etc. The hardware for measuring the magnitude may be located in the combined receiver 240 and/or the baseband processor 250, and the hardware may be coupled to the controller 255 to send magnitude measurements to the controller 255.

A challenge with self-calibration based on mutual coupling is that there may be strong internal coupling between signal paths in the phase array receiver/transmitter. The internal coupling may include inductive coupling between the signal paths and/or capacitive coupling between the signal paths. The internal coupling is in addition to the mutual coupling between the antennas discussed above. If the internal coupling is strong, the internal coupling may negatively impact the accuracy of self-calibration.

One approach to mitigate internal coupling is to design the phased array receiver/transmitter to reduce the internal coupling. This approach may include increasing the separation between signal paths, adding isolation structures (e.g., shielding) between the signal paths, etc. A drawback of this approach is that it may increase the cost and area of the phased array receiver/transmitter.

To address the problem of internal coupling, aspects of the present disclosure align the phase of the reference signal discussed above with the phase of a signal at the receiver caused by internal coupling, as discussed further below. In the discussed below, the signal at the receiver caused by internal coupling is referred to as the internal-coupling signal.

Figure 9:
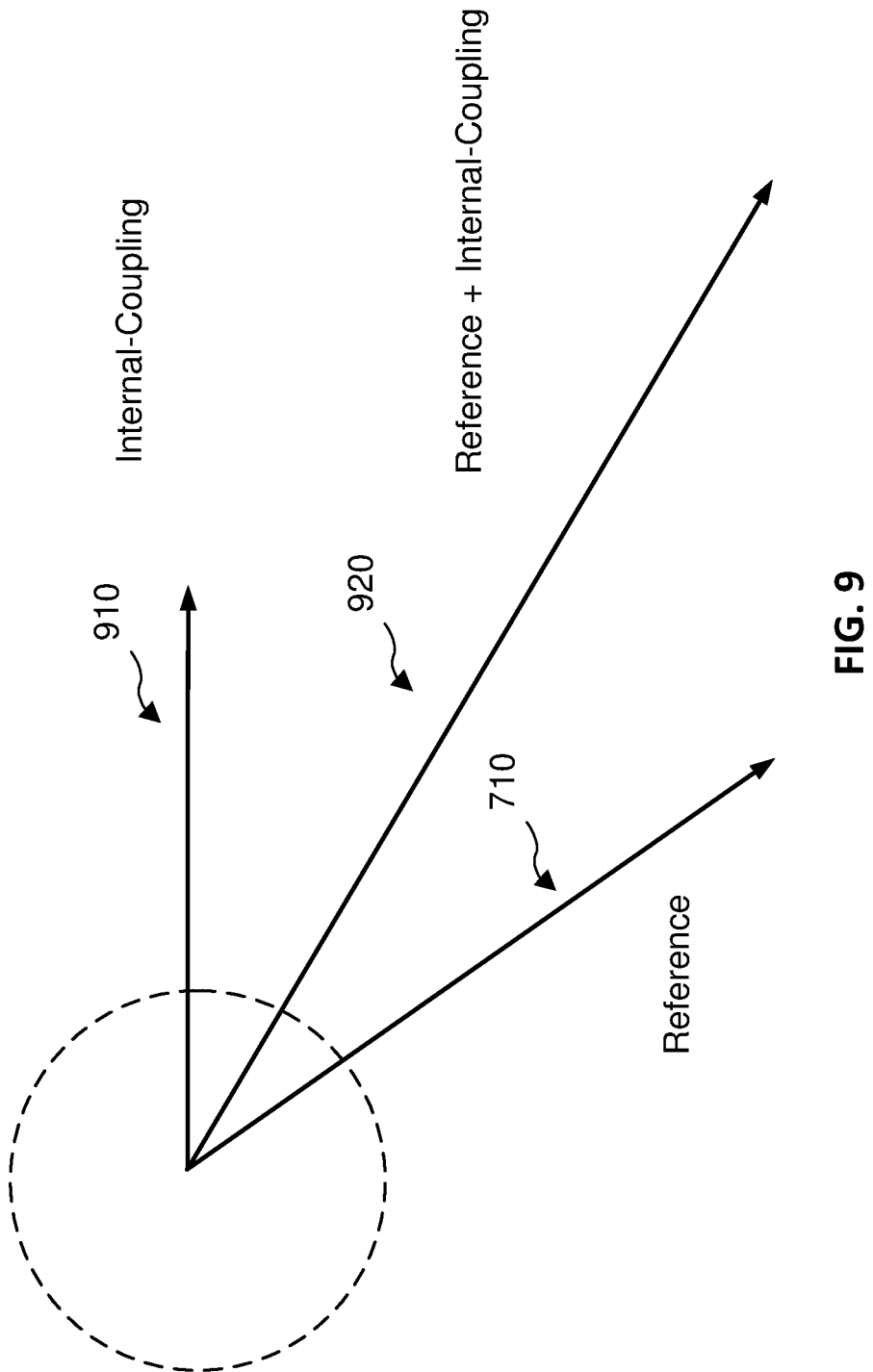
FIG. 9 is a vector diagram showing a reference vector and an internal-coupling vector according to certain aspects of the present disclosure.

FIG. 9 is a vector diagram showing the vector 710 representing the reference signal transmitted from the first antenna 210(1) discussed above. FIG. 9 also shows an example of a vector 910 representing the internal-coupling signal. For example, the internal-coupling signal may be caused by internal coupling (e.g., inductive coupling, capacitive coupling, etc.) between the transmit signal path corresponding to the first antenna 210(1) and the receive signal path corresponding to the third antenna 210(3). FIG. 9 also shows an example of a summation vector 920 representing the summation of the reference vector 710 and the internal-coupling vector 910 at the receiver (e.g., receiver chain 220(2)).

In the example shown in FIG. 9, self-calibration calibrates the phase of the second antenna 210(3) relative to the phase of the summation vector 920 (i.e., reference+internal coupling) rather than the phase of just the reference signal. Thus, if the internal-coupling signal is strong and the phase difference between the reference signal and the internal-coupling signal is large, then the phase difference between the summation vector 920 and the reference signal can be large, which significantly degrades the accuracy of the self-calibration. To address this, aspects of the present disclosure approximately align the phase of the reference signal with the phase of the internal-coupling signal at the receiver. This approximately aligns the phase of the reference signal with the phase of the summation vector 920, thereby significantly improving the accuracy of the self-calibration even in the presence of strong internal-coupling.

Figure 10:
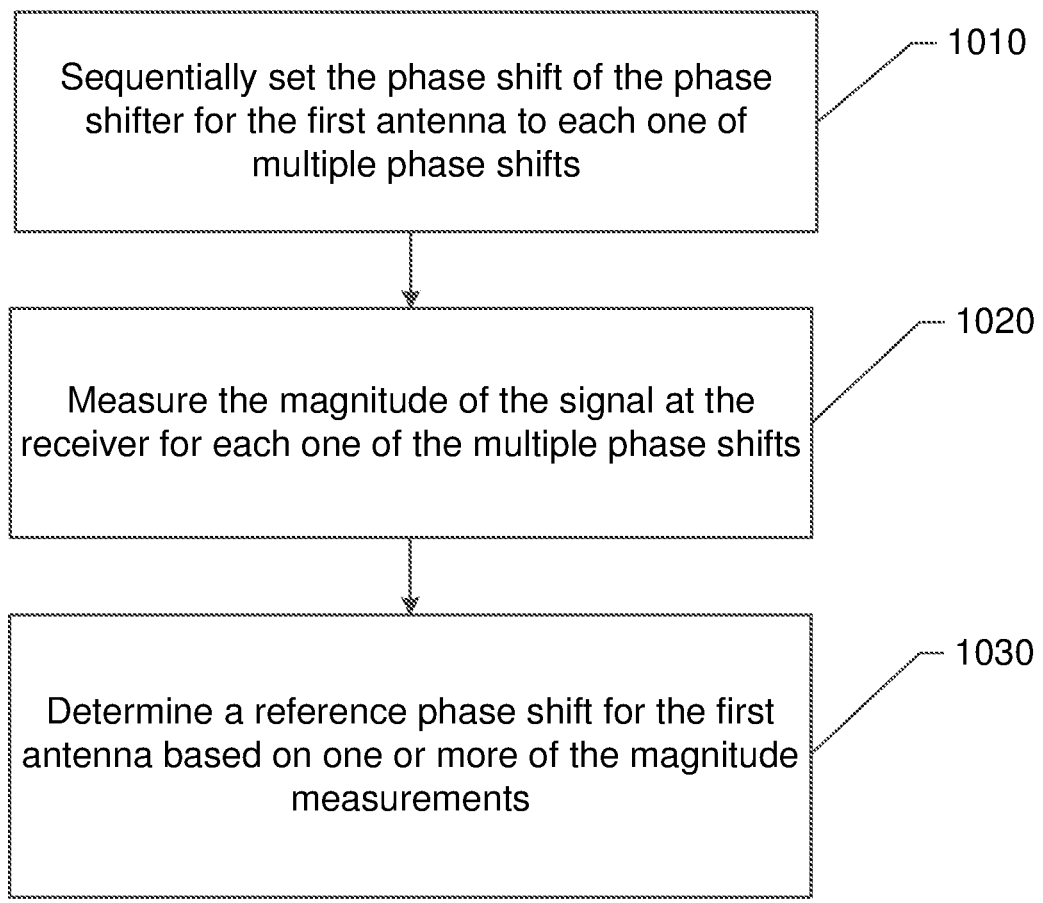
FIG. 10 is a flowchart illustrating an exemplary method for aligning a reference signal with an internal-coupling signal according to certain aspects of the present disclosure.

A method 1000 for aligning the phase of the reference signal with the internal-coupling signal at the receiver will now be discussed with reference to FIG. 10 according to certain aspects. The method 1000 may be performed by the controller 255. In the discussion below, the receiver refers to the receiver (e.g., receiver chain 220(2)) of the third antenna 210(2) discussed above.

At block 1010, the controller 255 sequentially sets the phase shift of the phase shifter 415(1) for the first antenna 210(1) to each one of multiple phase shifts. In FIG. 9, this is represented by rotating the phase of the vector 710 (which represents the reference signal). The multiple phase shifts may be spaced apart by a phase step. The multiple phase shifts at block 1010 are not necessarily the same as the multiple phase shifts at block 820 discussed above. The first antenna 210(1) may transmit at approximately the same power for each of the multiple phase shifts. Note that the second antenna 210(3) does not transmit during this time.

At block 1020, the controller 255 measures the magnitude of the signal at the receiver for each one of the multiple phase shifts. The signal at the receiver includes the reference signal received by the third antenna 210(2) and the internal-coupling signal. The signal at the receiver does not include the signal from the second antenna 210(3) since the second antenna 210(3) does not transmit during this time.

At block 1030, the controller 255 determines a reference phase shift for the first antenna 210(1) based on one or more of the magnitude measurements. For example, the controller 255 may determine which one of the multiple phase shifts corresponds to the maximum magnitude measurement for the receiver. The maximum magnitude occurs when the phase of the reference signal is approximately aligned with the phase of the internal-coupling signal. In this example, the controller 255 may set the reference phase shift to the phase shift corresponding to the maximum magnitude measurement. As a result, the reference signal is approximately in phase with the internal-coupling signal.

In another example, the controller 255 may determine which one of the multiple phase shifts results in the minimum magnitude measurement for the receiver. The minimum magnitude occurs when the phase of the reference signal is approximately 180 degrees out of phase with the phase of the internal-coupling signal. In this example, the controller 255 adjusts the phase shift corresponding to the minimum magnitude measurement by approximately 180 degrees, and sets the reference phase shift of the phase shifter 415(1) to the adjusted phase shift.

Once the reference phase shift is set, the controller 255 may perform the self-calibration method 800 discussed above to calibrate the relative phase between the first and second antennas 210(1) and 210(3). Thus, the method 1000 is performed prior to the self-calibration method 800 to align the phases of the reference signal and the internal-coupling signal. Once the reference signal and the internal-coupling signal are in phase, the controller 255 performs the self-calibration method 800 to determine the calibration phase shift.

In certain aspects, the controller 255 may sequentially set the phase shift of the phase shifter 415(1) for the first antenna 210(1) to each one of the multiple phase shifts at block 1010 as follows. The controller 255 may rotate the phase of the reference signal by changing the phase shift of the phase shifter 415(1) in steps. At each step, the controller 255 changes the phase shift of the phase shifter 415(1) by the phase step discussed above and measures the magnitude of the signal at the receiver. The controller 255 stops the phase rotation when the controller 255 detects the maximum magnitude. The controller 255 may detect the maximum magnitude by detecting when the measured magnitude at a particular step is larger than the measured magnitude at the immediately preceding step and the measured magnitude at the immediately succeeding step. Once the maximum magnitude is detected, the controller 255 sets the reference phase shift to the phase shift corresponding to the maximum magnitude.

In another example, the controller 255 stops the phase rotation when the controller 255 detects the minimum magnitude of the signal at the receiver. The controller 255 may detect the minimum magnitude by detecting when the measured magnitude at a particular step is smaller than the measured magnitude at the immediately preceding step and the measured magnitude at the immediately succeeding step phase. Once the minimum magnitude is detected, the controller 255 adjusts the phase shift corresponding to the minimum magnitude by approximately 180 degrees, and sets the reference phase shift to the adjusted phase shift.

Figure 11:
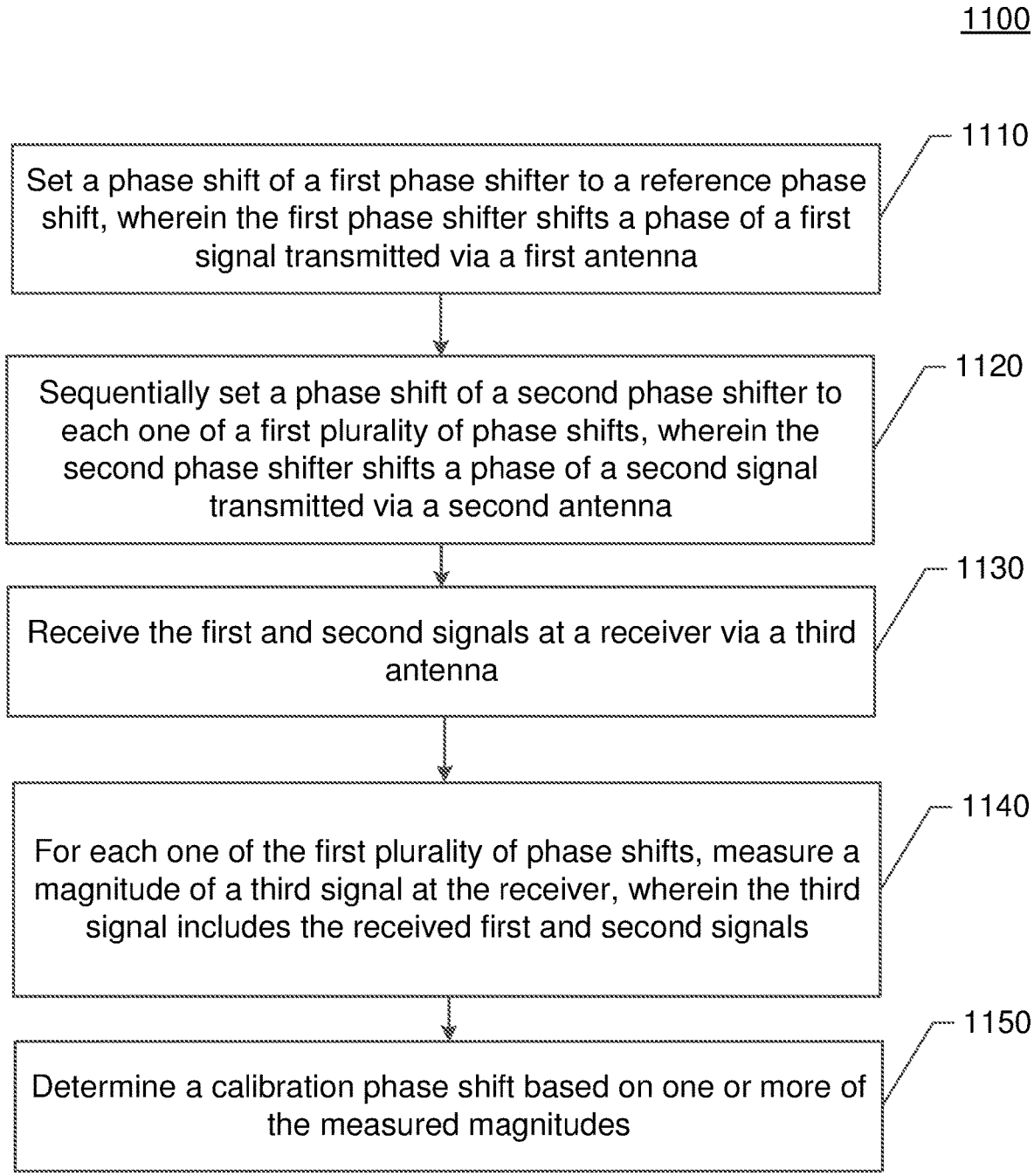
FIG. 11 is a flowchart illustrating an exemplary method for calibration according to certain aspects of the present disclosure.

FIG. 11 is a flowchart illustrating an exemplary method 1100 for calibration according to aspects of the present disclosure.

At block 1110, a phase shift of a first phase shifter is set to a reference phase shift, wherein the first phase shifter shifts a phase of a first signal transmitted via a first antenna. For example, the first phase shifter may correspond to phase shifter 415(1) and the first antenna may correspond to antenna 210(1).

At block 1120, a phase shift of a second phase shifter is sequentially set to each one of a first plurality of phase shifts, wherein the second phase shifter shifts a phase of a second signal transmitted via a second antenna. For example, the second phase shifter may correspond to phase shifter 415(3) and the second antenna may correspond to antenna 210(3). The first plurality of phase shifts may correspond to the multiple phase shifts at block 820.

At block 1130, the first and second signals are received at a receiver via a third antenna. For example, the receiver may correspond to receiver chain 220(2) and/or the combined receiver 240, and the third antenna may correspond to antenna 210(2). The third antenna may be located between the first antenna and the second antenna, and the third antenna may be approximately equidistant from the first antenna and the second antenna.

At block 1140, for each one of the first plurality of phase shifts, a magnitude of a third signal is measured at the receiver, wherein the third signal includes the received first and second signals. It is to be appreciated that the third signal may include an additional signal in addition to the first and second signals.

At block 1150, a calibration phase shift is determined based on one or more of the measured magnitudes. In one example, determining the calibration phase shift based on one or more of the measured magnitudes includes determining one of the first plurality of phase shifts corresponding to a maximum one of the measured magnitudes, and determining the calibration phase shift based on the determined one of the first plurality of phase shifts. In another example, determining the calibration phase shift based on one or more of the measured magnitudes includes determining one of the first plurality of phase shifts corresponding to a minimum one of the measured magnitudes, adjusting the determined one of the first plurality of phase shifts by approximately 180 degrees to obtain an adjusted phase shift, and determining the calibration phase shift based on the adjusted phase shift.

Figure 12:
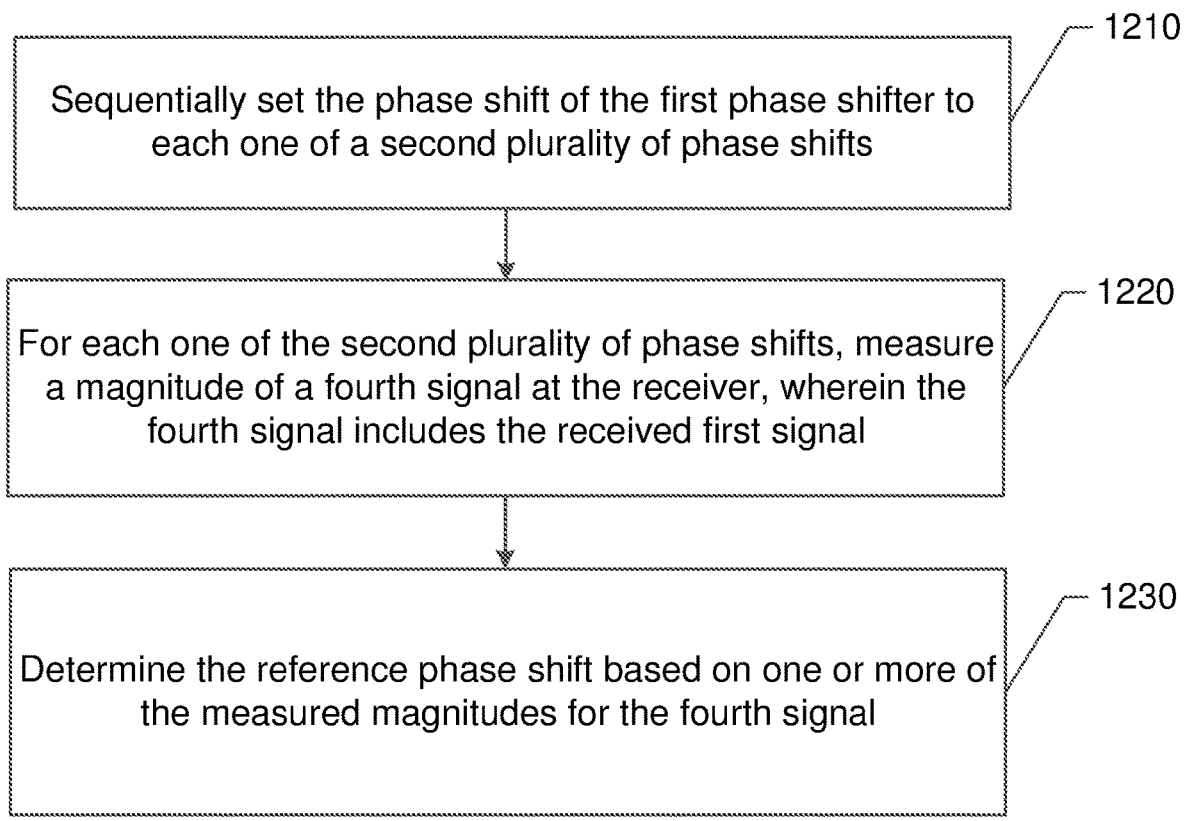
FIG. 12 is a flowchart illustrating additional optional blocks for the method in FIG. 11 according to certain aspects of the present disclosure.

The method 1100 may further include the optional blocks 1210 to 1230 shown in FIG. 12. The optional blocks 1210 to 1230 may be performed before block 1110 to determine the reference phase shift for the first phase shifter.

At block 1210, the phase shift of the first phase shifter is sequentially set to each one of a second plurality of phase shifts. The second plurality of phase shifts may correspond to the multiple phase shifts at block 1010. In one example, the second signal is not transmitted during this time.

At block 1220, for each one of the second plurality of phase shifts, a magnitude of a fourth signal is measured at the receiver, wherein the fourth signal includes the received first signal. In one example, the fourth signal does not include the second signal. The fourth signal may include an internal-coupling signal (e.g., due to inductive coupling, capacitive coupling, etc.) between the transmit signal path associated with the first antenna and the receive signal path associated with the third antenna.

At block 1230, the reference phase shift is determined based on one or more of the measured magnitudes for the fourth signal. For example, determining the reference phase shift may include determining one of the second plurality of phase shifts corresponding to a maximum one of the measured magnitudes for the fourth signal. In another example, determining the reference phase shift includes determining one of the second plurality of phase shifts corresponding to a minimum one of the measured magnitudes for the fourth signal, and adjusting the determined one of the second plurality of phase shifts by approximately 180 degrees.

It is to be appreciated that the present disclosure is not limited to the exemplary terms used above to describe aspects of the present disclosure. For example, it is to be appreciated that the antennas 210(1) to 210(n) in the phased array may also be referred to as antenna elements or radiating elements. In another example, it is to be appreciated that the splitter 430 may also be referred to as a divider.

The controller 255 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures.

The term "approximately" may mean within one phase step of a phase shifter. For example, two signals may be said to be "approximately" aligned in phase when the difference between the phases of the signals is within one phase step. In the disclosure, two distances are "approximately equidistant" if one of the distances is equal to between 90 to 110 percent of the other distance. In the disclosure, the term "approximately 180 degrees" means between 175 to 185 degrees. In this regard, it is to be appreciated that, in some implementations, it may not be possible to adjust a phase shift of a phase shifter by exactly 180 degrees (e.g., if 180 degrees is not divisible by a phase step). It is also to be appreciated that degrees may also be expressed in terms of radians. In this regard, 180 degrees translates to $\pi$ radians.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for calibration, comprising:
    sequentially setting a phase shift of a first phase shifter to each one of a first plurality of phase shifts, wherein the first phase shifter shifts a phase of a first signal transmitted via a first antenna;
    receiving the first signal at a receiver via a second antenna;
    for each one of the first plurality of phase shifts, measuring a magnitude of a second signal at the receiver, wherein the second signal includes the received first signal;
    determining a reference phase shift based on one or more of the measured magnitudes for the second signal;
    setting the phase shift of the first phase shifter to the reference phase shift;
    sequentially setting a phase shift of a second phase shifter to each one of a second plurality of phase shifts, wherein the second phase shifter shifts a phase of a third signal transmitted via a third antenna;
    receiving the first and third signals at the receiver via the second antenna;
    for each one of the second plurality of phase shifts, measuring a magnitude of a fourth signal at the receiver, wherein the fourth signal includes the received first and third signals; and
    determining a calibration phase shift based on one or more of the measured magnitudes for the fourth signal;
    wherein the second signal does not include the third signal.

2. The method of claim 1, wherein the second antenna is located between the first antenna and the third antenna.

3. The method of claim 2, wherein the second antenna is approximately equidistant from the first antenna and the third antenna.

4. The method of claim 1, wherein determining the calibration phase shift comprises:
    determining one of the second plurality of phase shifts corresponding to a maximum one of the measured magnitudes for the fourth signal; and
    determining the calibration phase shift based on the determined one of the second plurality of phase shifts.

5. The method of claim 4, wherein determining the calibration phase shift based on the determined one of the second plurality of phase shifts comprises determining a difference between the determined one of the second plurality of phase shifts and the reference phase shift.

6. The method of claim 1, wherein determining the calibration phase shift comprises:
    determining one of the second plurality of phase shifts corresponding to a minimum one of the measured magnitudes for the fourth signal;
    adjusting the determined one of the second plurality of phase shifts by approximately 180 degrees to obtain an adjusted phase shift; and
    determining the calibration phase shift based on the adjusted phase shift.

7. The method of claim 6, wherein determining the calibration phase shift based on the adjusted phase shift comprises determining a difference between the adjusted phase shift and the reference phase shift.

8. The method of claim 1, wherein determining the reference phase shift comprises determining one of the first plurality of phase shifts corresponding to a maximum one of the measured magnitudes for the second signal.

9. The method of claim 1, wherein determining the reference phase shift comprises:

determining one of the first plurality of phase shifts corresponding to a minimum one of the measured magnitudes for the second signal; and adjusting the determined one of the first plurality of phase shifts by approximately 180 degrees.

10. The method of claim 1, wherein the third signal is not transmitted during a time within which the phase shift of the first phase shifter is sequentially set to each one of the first plurality of phase shifts.

11. A system, comprising:
a first phase shifter configured to shift a phase of a first signal transmitted via a first antenna;
a second phase shifter configured to shift a phase of a second signal transmitted via a second antenna;
a receiver configured to receive at least one of the first and second signals via a third antenna; and
a controller configured to:
sequentially set a phase shift of the first phase shifter to each one of a first plurality of phase shifts;
for each one of the first plurality of phase shifts, measure a magnitude of a third signal at the receiver, wherein the third signal includes the received first signal and does not include the second signal;
determine a reference phase shift based on one or more of the measured magnitudes for the third signal;
set the phase shift of the first phase shifter to the reference phase shift;
sequentially set a phase shift of the second phase shifter to each one of a second plurality of phase shifts;
for each one of the second plurality of phase shifts, measure a magnitude of a fourth signal at the receiver, wherein the fourth signal includes the received first and second signals; and
determine a calibration phase shift based on one or more of the measured magnitudes for the fourth signal.

12. The system of claim 11, wherein the third antenna is located between the first antenna and the second antenna.

13. The system of claim 12, wherein the third antenna is approximately equidistant from the first antenna and the second antenna.

14. The system of claim 11, wherein the controller is configured to determine the calibration phase shift by:
determining one of the second plurality of phase shifts corresponding to a maximum one of the measured magnitudes for the fourth signal; and
determining the calibration phase shift based on the determined one of the second plurality of phase shifts.

15. The system of claim 14, wherein the controller is configured to determine the calibration phase shift based on the determined one of the second plurality of phase shifts by determining a difference between the determined one of the second plurality of phase shifts and the reference phase shift.

16. The system of claim 11, wherein the controller is configured to determine the calibration phase shift by:

determining one of the second plurality of phase shifts corresponding to a minimum one of the measured magnitudes for the fourth signal;
adjusting the determined one of the second plurality of phase shifts by approximately 180 degrees to obtain an adjusted phase shift; and
determining the calibration phase shift based on the adjusted phase shift.

17. The system of claim 16, wherein the controller is configured to determine the calibration phase shift based on the adjusted phase shift by determining a difference between the adjusted phase shift and the reference phase shift.

18. The system of claim 11, wherein the controller is configured to determine the reference phase shift by determining one of the first plurality of phase shifts corresponding to a maximum one of the measured magnitudes for the third signal.

19. The system of claim 11, wherein the controller is configured to determine the reference phase shift by:
determining one of the first plurality of phase shifts corresponding to a minimum one of the measured magnitudes for the third signal; and
adjusting the determined one of the first plurality of phase shifts by approximately 180 degrees.

20. A method for calibration, comprising:
sequentially setting a phase shift of a first phase shifter to each one of a first plurality of phase shifts, wherein the first phase shifter shifts a phase of a first signal transmitted via a first antenna;
receiving the first signal at a receiver via a second antenna;
for each one of the first plurality of phase shifts, measuring a magnitude of a second signal at the receiver, wherein the second signal includes the received first signal;
determining a reference phase shift based on one or more of the measured magnitudes for the second signal;
setting the phase shift of the first phase shifter to the reference phase shift;
sequentially setting a phase shift of a second phase shifter to each one of a second plurality of phase shifts, wherein the second phase shifter shifts a phase of a third signal transmitted via a third antenna;
receiving the first and third signals at the receiver via the second antenna;
for each one of the second plurality of phase shifts, measuring a magnitude of a fourth signal at the receiver, wherein the fourth signal includes the received first and third signals; and
determining a calibration phase shift based on one or more of the measured magnitudes for the fourth signal;
wherein the third signal is not transmitted during a time within which the phase shift of the first phase shifter is sequentially set to each one of the first plurality of phase shifts.

* * * * *